Sept. 21, 1943.       J. M. RODRIGUEZ       2,330,147
SCOOTER CAR CHASSIS AND TRUCK
Filed June 21, 1941           3 Sheets-Sheet 1
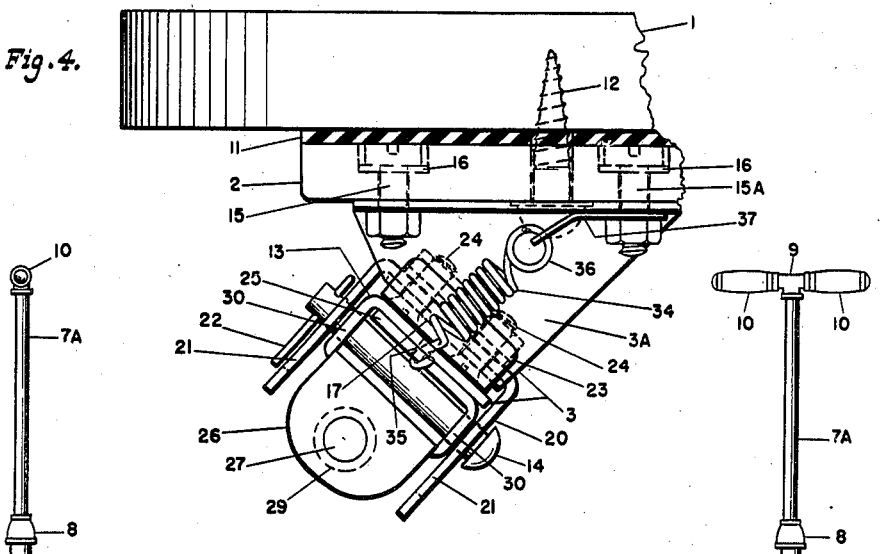
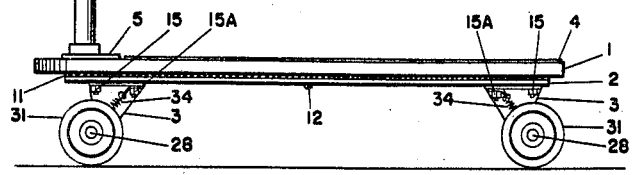
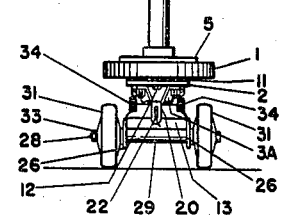
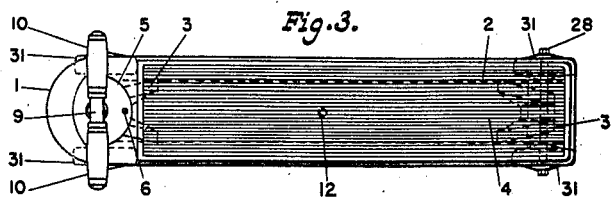
WITNESSES
INVENTOR
Joseph M. Rodriguez

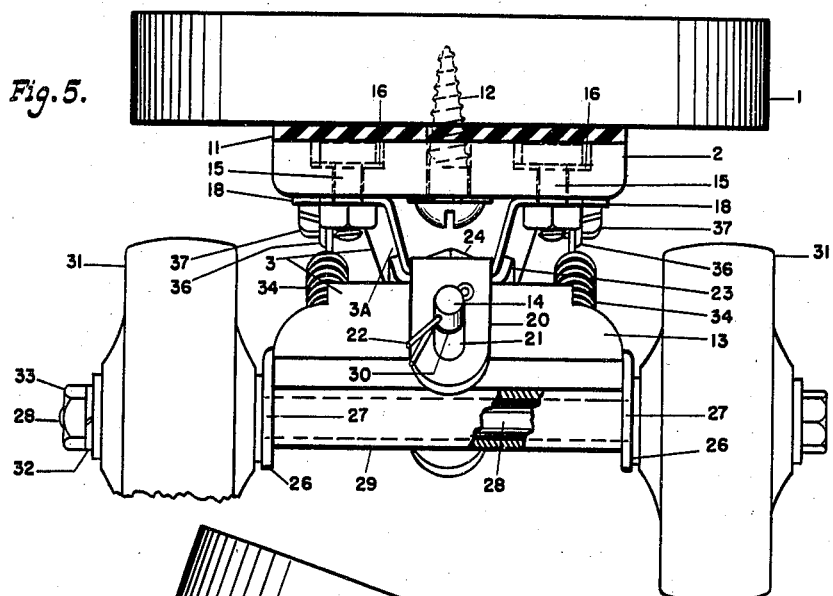

Sept. 21, 1943. J. M. RODRIGUEZ 2,330,147
SCOOTER CAR CHASSIS AND TRUCK
Filed June 21, 1941 3 Sheets-Sheet 3
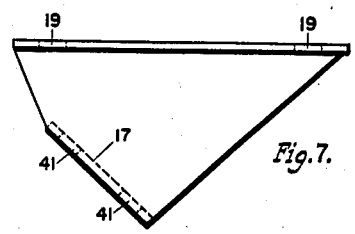
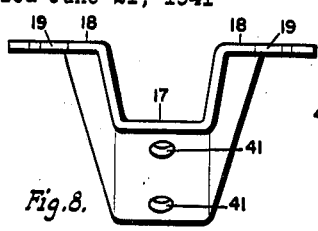
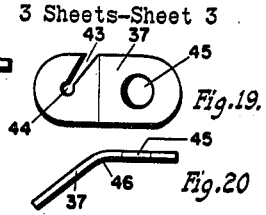
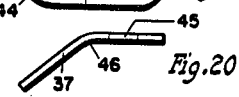
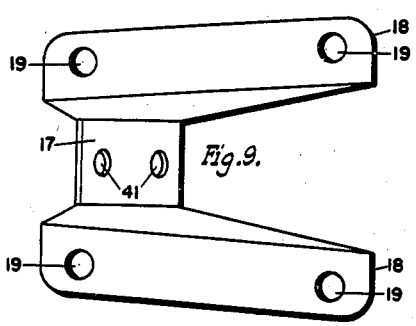
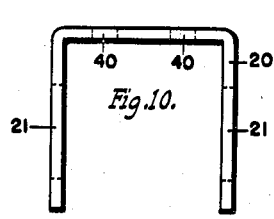
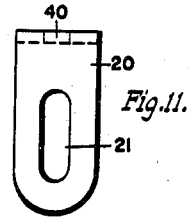
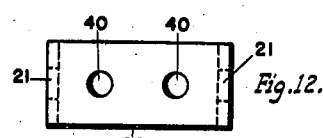
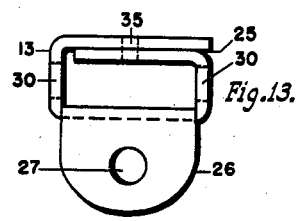
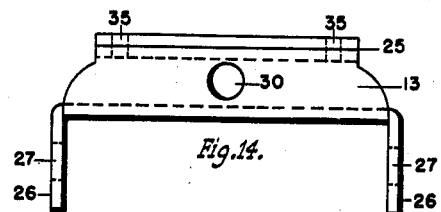
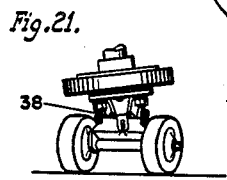
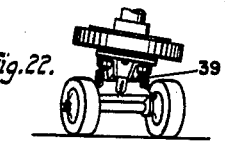
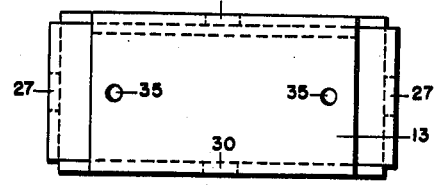
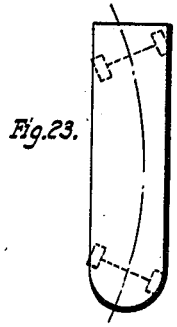
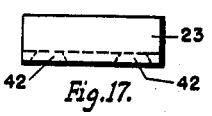
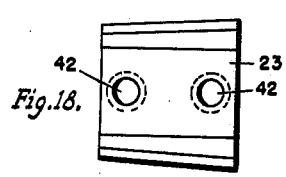
WITNESSES
INVENTOR
Joseph M. Rodriguez Patented Sept. 21, 1943

2,330,147

UNITED STATES PATENT OFFICE 2,330,147

SCOOTER CAR CHASSIS AND TRUCK

Joseph M. Rodriguez, Brooklyn, N. Y.

Application June 21, 1941, Serial No. 399,107

2 Claims. (Cl. 280—87.04)

This invention relates to a new type chassis and trucks for scooter vehicles or coasters popular with children as a toy vehicle and of the four wheel type, and so constructed that it can be propelled over the side walk or street pavement by the pushing action of one leg while the other is supported by the platform of the scooter, and a rigid handle bar is firmly fastened to the top and in front of the platform, whereby the child will be able to hold on while riding same without any difficulty in keeping equilibrium, and serves as a very easy means for steering.

In general any scooter vehicle using a chassis and trucks of my invention, occupies very little space, and the construction of the trucks supporting the wheels, which is explained in detail below is constructed in such a way, that by only tilting the vertical arm with handles laterally to the right or left, will cause the wheels to turn to either direction without any tendency of overturning, being that same is of the four wheel type, and therefore any child will be able to ride same with ease.

The important object of the invention is to provide a combination vehicle of the character described consisting of a chassis embodying novel wheel mountings which consists of two trucks, one of which with two rubber cushion tire wheels is fastened to and under the front end of the chassis, said chassis can be made of either hardwood or metal. Another truck of the same construction with two more wheels is fastened to and under the back end of the chassis in the opposite position to the front one. Both trucks are fastened to said chassis by means of bolts. This is clearly shown in the accompanying drawings.

Another very important object of the invention is to provide a chassis of the aforementioned character with a semi-soft rubber pad on top of same as a shock absorbing means on to which the platform or footboard of the scooter is fastened. Said rubber pad eliminates the transmission of vibration from the wheels to the platform caused by running the scooter over rough surface and passing over joints in the street pavements and sidewalks.

A further aim of the invention is to provide a chassis and trucks for scooter vehicles of the type described, which is very simple in construction and the wearing parts of the truck can be replaced at a very low cost. It is built strong, that it will withstand rough handling, and any child can ride it, and find it of great amusement. It is also compact, light in weight, and it can be manufactured at a low cost.

With the above, and other objects of my invention in view, same consists in the features of construction, combination and arrangement of parts as will be hereinafter more fully described in detail, as illustrated in the accompanying drawings, showing the preferred embodiment of the invention, and pointed out in the claims hereunto appended.

It is understood of course, that changes, variations and modifications may be made in the invention, as come properly within the scope of the appended claims without departing from the spirit of the invention or sacrificing any of its advantage.

In the accompanying drawings:

Fig. 1 is a side elevation of the scooter showing the chassis and trucks constructed in accordance with the invention.

Fig. 2 is a front elevation of the scooter illustrated in Fig. 1.

Fig. 3 is a plan view of the scooter illustrated in Fig. 1.

Fig. 4 is an enlarged fragmentary detail view of a side sectional elevation of the front portion of the platform mounted on the front part of the chassis with the rubber pad in between for shock absorbing, and showing the construction of the truck of my invention.

Fig. 5 is an enlarged fragmentary detail front elevation of the platform mounted on the rubber pad and chassis with the truck with wheels fastened to same.

Fig. 6 is an enlarged fragmentary detail front elevation of the platform tilted with the chassis with truck and wheels fastened to same, and showing the turning position of the lower part of the truck with wheels when the platform is tilted as shown.

Fig. 7 is a side elevational view of the upper section or frame of the truck of my invention.

Fig. 8 is a front elevational view thereof.

Fig. 9 is a plan view of the upper section of the truck frame.

Fig. 10 is a side elevational view, of the inverted U-shape steel strap, which is fastened in an inclined hanging position from the base of the upper section truck frame, and which supports slidingly into slots cut longitudinally in the center of both legs the lower section of the truck frame by means of a king bolt.

Fig. 11 is a side elevational view of same, showing the position of the slots cut into the hanging ends of same.

Fig. 12 is a plan view thereof.

Fig. 13 is a side elevational view of the bottom section of the truck frame which supports the wheels.

Fig. 14 is a front elevational view of the bottom section of the truck frame.

Fig. 15 is a plan view thereof.

Fig. 16 is the sliding shoe fastened to the bottom outside part of the top section of the truck.

Fig. 17 is a side elevational view of the sliding shoe.

Fig. 18 is a plan view thereof.

Fig. 19 is a small steel strap with a hook type slot-cut on the side of same downward towards the center for hooking one end of the spring which pulls the lower section of the truck upward against the sliding shoe which is fastened to the top section of the truck.

Fig. 20 is a side elevational view thereof.

Fig. 21 is a front elevation of the scooter showing part of the vertical arm fastened to a platform, which is fastened on top of the chassis onto which the trucks are fastened and tilted to the right for right hand turning of the scooter showing the position taken by the wheels fastened to the truck of my invention. Thus turning the front wheels to right and the back wheels to the left in a semi-circle position to that of the front set of wheels (right hand turn is considered when mounted or riding the scooter).

Fig. 22 is a front elevation of the scooter showing part of the vertical arm fastened to a platform which is fastened on top of the chassis onto which the trucks are fastened, and tilted to the left for left hand turning of the scooter showing the position taken by the wheels fastened to the truck of my invention.

Fig. 23 is a plan view of the scooter showing the position taken by the bottom member of the front and back trucks which supports the wheels when the vertical arm with handles is tilted to the right for right hand turning.

Fig. 24 is a plan view of the scooter showing the position taken by the bottom member of the front and back trucks which supports the wheels when the vertical arm with handles is tilted to the left for left hand turning of the scooter.

Similar reference characters indicating and describing the corresponding parts throughout the several views in the drawings are given below:

In the drawings, 1 designates a base or bed commonly known as a platform, which may be constructed of wood or metal, mounted on a chassis 2 which supports a semi-soft rubber pad 11. Said chassis is mounted on two trucks 3 of the same construction, one fastened to and under the front end of the chassis and one to and under the back end of the chassis. Each truck supports two wheels. In the drawings, 4 designates a corrugated rubber mat on top of the scooter platform. A floor type flange 5 is mounted on top and in front of the platform, fastened to same by means of screws 6. Into said flange is screwed a vertical arm 7. Said vertical arm is reduced in size by means of a reducer 8 to a smaller vertical arm 7A. On top of this smaller vertical arm there is a reducing type T 9 for handles laterally therefrom 10. In the drawings, 11 designates a soft rubber pad between the platform 1 and the chassis 2 acting as a shock absorber, eliminating considerable vibration which is transmitted from the trucks 3 and chassis 2 to platform 1 when riding over rough pavement.

In the drawings, 2 represents a stringer or chassis onto which is fastened with adhesive or otherwise the shock absorbing rubber pad 11, under the chassis is fastened the trucks 3. The chassis 2 with rubber pad 11 and with trucks 3 fastened to same, is screwed to and under the platform 1 by means of screws 12. The chassis also acts as a reinforcing means to the platform, preventing same from sagging at the center when riding same. It also serves to raise the base or platform higher from the trucks, allowing a greater clearance between the said platform 1 and wheels, particularly when tilting the vertical arm with the platform when making a turn.

The trucks 3 are made of stamped steel, and divided into two parts or sections, the top 3A and the lower 13 held together by means of an inclined king bolt or pin 14. The top section of the truck 3A consists of five separately made parts, namely, the flanged inclined channel shaped body 3A, the inverted U-shape hanger 20, the sliding shoe 23, and two hook type lugs 37, one on each side of the flanged ends of the inclined channel shaped body 3A for supporting one end of the pulling springs 34.

The body 3A of the top section of the truck is fastened to the stringer or chassis by means of bolts 15 and 15A with washers 16. The heads of said bolts with washers are countersunk into the top part of the chassis 2 shown in Figs. 4, 5, and 6.

The sides of the top section of the truck 3A are bent vertically. The longest or back end is bent to approximately 80 degrees, and the front or short end is bent to approximately 88 degrees, as clearly shown in Fig. 5 and Fig. 8 or a similar flanged channel shape with the back end being deeper or longer than the front end, as shown in Figs. 4, 7, 8, and 9 so that the floor or bottom part 17 of the channel shape will be inclined at an angle of approximately 45 degrees between the front and back end, as shown in the side elevation of same in Fig. 4 and Fig. 7. The two top ends of the channel shape or vertical ends are bent outward horizontally as flanges 18 shown in Figs. 5, 6, 8, and 9 with holes conveniently drilled 19 for fastening the truck to the chassis with bolts 15 and 15A. The inclined floor or bottom part of the channel shape truck body is conveniently drilled with two holes 41 for bolting the hanger 20 and sliding shoe 23 to same.

The longest or back ends of the sides of the top section of the trucks 3A is bent vertically to approximately 80 degrees, and bent so, that it will be 8 degrees less than the front vertical short ends, and in so doing the flanged ends are spread outward laterally, the back or long ends a little more than the front or short ends, as shown in Fig. 8 and Fig. 9. This additional spread of the back ends of the vertically bent walls of the channel shaped top section truck body 3A acts as a knee brace reinforcing means to prevent lateral bending of the top section of the trucks, when tilting the vertical arm with the platform for making turns.

The hanger 20 shown in Figs. 2, 4, 5, 6, 10, 11, and 12 is an inverted U-shape strap steel fastened to the floor of the top section truck body 3A with a slot cut vertically into each of the two hanging ends 21. Into these slots, slides vertically at an angle of approximately 45 degrees a king bolt or pin 14 which supports the bottom section of the truck 13 which supports the wheels. The hanger 20 is made of strap steel of a heavier gauge than the top section or body 3A of the truck. It is made of heavier gauge to take care of the wearing effect due to the continuous sliding vertically into the slot 21 of the steel king pin 14 which is held in the slots by means of cotter pin 22. Two holes 40 is drilled into the bottom of the inverted U-shape piece hanger 20 for fastening to the top of the inclined floor part of the top channel shape truck body 3A.

In the drawings, 23 designates a sliding steel shoe, shown in Figs. 4, 5, 6, 16, 17, and 18. It is properly bent to fit over the bottom outside part of the top section truck body 3A. Said shoe is suitably drilled with holes 42 countersunk on the outside part of the shoe, for fastening same to the top section truck body 3A by means of flat head bolts 24. The flat heads of the bolts fit evenly into the countersunk holes 42 without projecting out of same, so that said heads will not interfere with the sliding motion of the shoe over the top of the bottom or moveable section of the truck 13 as shown in Figs. 4, 5, and 6.

The flat head bolts 24 hold together three of the component parts of the top section of the truck 3A namely the flanged channel shape body 3A, the hanger or inverted U-shape part 20 and the sliding shoe 23.

The lower section of the trucks 13 are made of stamped steel bent in a semi-rectangular box shape as shown in Figs. 13, 14, and 15. The top ends are bent overlapping one another 25 as shown in Figs. 4, 13, and 14 with two tongue shaped projecting ends or lugs 26 bent downward at right angle to the rectangular box shaped body, shown in Figs. 4, 5, 6, 13 and 14 and a hole 27 drilled in the center of each tongue shaped ends 26 for supporting axle 28. A hole 30 is drilled in the center of the rectangular box shaped body for pivotally supporting the king pin 14.

In the drawing, 29 designates a filler or tubular member in between the two tongue shaped axle supports 26 thru which passes the axle 28 and acts as a reinforcing means, when the axle with wheels are tightly fastened to said axle holder. This filler or tubular member, prevents the two tongue shaped axle supports 26 from bending laterally, or, it takes care of the lateral strain or load on the two axle holders 26 when tilting the vertical bar together with platform for making turns; thus making same rigid, and equalizing the load on the two lugs 26 at the same time.

The lower section of the truck 13 is held in place inside between the two sides of the inverted U-shape piece 20 of the top section of the truck by means of a king pin 14 inserted thru the slots cut longitudinally in the center of the inverted U-shape piece and thru the hole 30 drilled in the center of the lower section of the truck, shown in Figs. 4, 5, 13, 14, and 15. The king pin 14 is held in place inside of the two slots cut into the hanging ends of the inverted U-shape piece by means of a cotter pin 22. Each lower section of the trucks carry a pair of rubber cushion tire wheels 31 held in place by an axle 28 affixed to axle holder or carrier 26 by lock washer 32 and nut 33.

The truck at the back end of the scooter is exactly the same as the one in the front end, with the exception that it is bolted to the chassis in the opposite position to that of the front, whereby when the platform 1 is tilted laterally by means of the vertical arm, the axle 28 with the wheels 31 will be forced to angle for making a turn, either to right or left; or in so doing the back set of wheels will angle in the opposite direction to that of the front set of wheels, or a semi-circle arrangement of turning of the lower section of the front truck and the lower section of the back truck as shown in Fig. 23 and Fig. 24.

The trucks being the steering means for the scooter, a turn is made by tilting the vertical arm 7 jointly with 7A holding handles laterally therefrom 10 either to the right for right hand turn or to the left for left hand turn. The tilting of the vertical arm which is fastened to the top of the platform by means of a floor type flange 5 and screws 6 together with the rubber shock absorbing pad 11 and the chassis 2 with the top section of the truck 3A fastened to same, is permitted by the sliding motion of the lower member of the trucks 13 which with a king pin 14 slides up and down at an angle of 45 degrees in the slot openings 21 into the inverted U-shape piece of the top member of the trucks. This operation will force to turn the lower section of the truck carrying wheels, to either direction for making turns.

The lower section of the trucks 13 is constantly held in a straight position, for straight running of the scooter, by means of two steel wire springs 34 on each truck, shown in Figs. 1, 2, 4, 5, and 6. These springs are always in pulling tension, whereby constantly keeping the top flat overlapping bearing part of the lower truck section, firmly against the sliding shoe 23 of the top section of the truck. This is the normal position of the lower section of the truck for straight running of the scooter. One end of the springs 34 is hooked in a small hole 35 drilled in the center of the two overlapping ends of the lower section of the trucks carrying wheels, or the turning section, shown in Figs. 4, 13, 14, and 15.

The top ends of the springs 34 at 36 are each hooked into a small lug or strip of strap steel 37 with an open slot 43 cut at one end diagonally from the side downward towards the center and leading towards a stop hole 44 in the center of the lug at the bottom of the slot to keep the spring from sliding out as shown in Fig. 19 and a hole 45 drilled at the other end of each lug for fastening same to the two ends of the flanges on the top section of the trucks by means of the same bolts 15A that fastens the flanges to the chassis clearly shown in Fig. 4. These small lugs or strips of strap steel 37 holding the top end of the springs are bent in the center 46 at an angle of approximately 45 degrees, to allow the spring to pull up exactly in center line with the lower section of the truck, or straight right angle pull from where the other end of the spring is hooked to holes 35.

When the platform with the chassis and the top member of the truck is tilted laterally to either direction, there are two bearing points that take place in this operation, between the sliding shoe of the top section of the truck and the lower section of the trucks, at 38 and 39. These bearing points are shown in Figs. 21 and 22.

Fig. 21 shows a front elevation of the scooter with the platform 1 tilted laterally to the right together with the rubber pad 11, chassis 2, and the top section of the truck 3A for right hand turning of the scooter (right hand turn is considered when mounted on same). In this mentioned tilted position it will be noticed that the bearing point between the sliding shoe of the top section of the truck 3A and the lower or turning section 13 of the trucks is at 38, thus forcing the king pin 14 to slide downward in the slots 21 with the lower section of the truck 13, with wheels 31, thus forcing same to turn to the right as shown in Fig. 21. The greater the angle of tilting the platform, the greater will be the turning operation of the lower section of the truck, thereby making a sharper turn. The reverse operation will take place when tilting the vertical arm with platform to the left for left hand turning, and in so doing the bearing point will be at 39 and in either case one of the pulling springs 34 is contracted while the other is forced to expand more.

What I claim as my invention is:

1. A scooter car of the type described comprising a chassis mounted on two trucks of the same construction, one at each end of the chassis, said trucks being mounted in longitudinally reversed position, each truck consisting of an upper and a lower section, the upper section comprising a flanged channel shaped member having the base thereof bent so the same is inclined at an angle of approximately 45 degrees with respect to the chassis, an inverted U-shaped steel strap member having a slot cut longitudinally in the center of each of the legs thereof, said U-shaped member being fastened to and depending from the base of said channel shaped member, a steel shoe of channel shape secured to and below the base of said channel shaped member, and having the edges thereof nested around the outside vertical walls of said channel member, the lower truck section including a frame of steel plate having the two sides bent up and then over in overlapping relation, forming a rectangular box shape open at its ends, and the base end pieces bent down at right angle to form lugs, each of said lugs having an opening therein, a tubular member inserted in between the two lugs and in line with the two openings to receive a wheel carrying axle, a transverse opening through the center of said box frame, a king bolt disposed through the slots of said inverted U-shaped member of the upper section and through the opening in said rectangular box frame, forming a pivot for the latter, and a pair of springs one end of each secured at the center of each end of the upper portion of said box frame, and their other ends to lugs fastened to the flanges of the channel shaped member of the top section, whereby the bottom rectangular box shape frame carrying the wheels is urged against said steel shoe fastened to the upper channel shaped member.

2. A scooter car of the type described comprising a chassis consisting of a narrow strip of rigid material on top of which is affixed a strip of sponge rubber sandwiched between said chassis and an overlapping footboard all fastened together as a unit, said chassis being mounted on two trucks of the same construction, one at each end of the chassis, said trucks being mounted in longitudinal reversed position, and a plurality of spaced bolts for securing said chassis onto said trucks, each truck consisting of an upper and a lower section, the upper section comprising a flanged channel shaped member having the base thereof bent so the same is inclined at an angle of approximately 45 degrees with respect to the chassis, with the vertical walls of one end at the flanges, spread outward more than the other, an inverted U-shape steel strap member having a slot cut longitudinally in the center of each of the legs thereof, said U-shape member being fastened to and hanging from the inclined base of said flanged channel shape member, a steel shoe of channel shape fastened to and below the base of said flanged channel shape member, and having the edges thereof nested around the outside vertical walls of same, the lower truck section consisting of a steel plate frame bent to a rectangle box shape having the two sides bent upward and then over in overlapping relation on top, and the end pieces of the base bent down at right angle to form lugs, each of said lugs having an opening therein, a tubular member inserted to fit in between the two lugs in line with the openings to receive a wheel carrying axle, a transverse opening through the center of the vertical walls of said rectangular box shape frame, a king bolt disposed through the slots of said inverted U-shape member, and through the transverse opening in said rectangular box shape frame forming a sliding pivot for the latter at an angle of 45 degrees in the slots cut longitudinally in the center of said inverted U-shape member, and a pair of springs, one end of each secured at the top ends of said box shape frame, and their other ends to hook shaped lugs fastened to the flanges of said channel shape member whereby the lower box shaped section carrying the wheels, is urged against said steel shoe fastened to the flanged channel shape member.

JOSEPH M. RODRIGUEZ.